(12) United States Patent
Tsugai et al.

(10) Patent No.: US 6,584,840 B2
(45) Date of Patent: Jul. 1, 2003

(54) ANGULAR VELOCITY SENSOR

(75) Inventors: Masahiro Tsugai, Tokyo (JP); Nobuaki Konno, Tokyo (JP); Eiji Yoshikawa, Tokyo (JP); Hiroyuki Fujita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 45 days.

(21) Appl. No.: 09/978,666

(22) Filed: Oct. 18, 2001

(65) Prior Publication Data
US 2002/0139187 A1 Oct. 3, 2002

(30) Foreign Application Priority Data
Mar. 30, 2001 (JP) ........................................ 2001-099358

(51) Int. Cl.⁷ ............................................... G01C 19/00
(52) U.S. Cl. .................................................. 73/504.09
(58) Field of Search .......................... 73/504.09, 504.12

(56) References Cited

U.S. PATENT DOCUMENTS 5,408,877 A    4/1995  Greiff et al.
6,062,082 A  * 5/2000  Guenther et al. ........ 73/514.16
6,250,157 B1 * 6/2001  Tounge ..................... 73/504.04

* cited by examiner

Primary Examiner—Richard A. Moller
(74) Attorney, Agent, or Firm—Leydig, Voit & Mayer, Ltd.

(57) ABSTRACT

A sensitive angular velocity sensor is provided without increasing an inter-electrode gap for inducing a torsional vibration. An angular velocity sensor which employs an electrostatic drive system for inducing drive vibration by using inter-electrode electrostatic attraction includes a pair of inertial mass members which are connected to each other through a connection frame having a length such that the inertial mass members are point-symmetrical with respect to a central point of the connection frame and which are held along a plane direction of a substrate, a pair of elastic beams which are connected to each other at an interval in opposite directions along a longitudinal direction from the central point of the connection frame on opposite sides of the connection frame, a pair of drive plates which are connected to the ends of the elastic beams, which have an electrode constituting an electrostatic attraction generating structure together with a drive electrode on the substrate, and which are supported such that the drive plates can be moved in at least one direction along the plane direction of the substrate to torsionally vibrate the inertial mass members about the central point of the connection frame.

6 Claims, 5 Drawing Sheets

ANGULAR VELOCITY SENSOR

BACKGROUND OF THE INVENTION

The present invention relates to an angular velocity sensor.

As well known, angular velocity sensors are used for various objects such as motion control of a vehicle or an airplane and control for preventing hand shaking from affecting a video camera. As one of the angular velocity sensors, an angular velocity sensor which employs an electrostatic drive system for inducing drive vibration by using electrostatic attraction generated between electrodes is known. As an example of a conventional angular velocity sensor which employs the electrostatic drive system, the plan view and the sectional view of an angular velocity sensor disclosed in U.S. Pat. No. 5,408,877 are shown in FIGS. 9 and 10. The operation principle of the angular velocity sensor 80 is as follows. In a drive gimbal plate 82 having an inertia mass member 81 fixed to the center of the drive gimbal plate 82, when drive voltages of which the phases are reversed are applied by a drive electric circuit 88 to respective drive electrodes 83 held parallel to each other on a semiconductor substrate 90 and opposing the drive gimbal plate 82, a torsional vibration about a Y-axis occurs about a torsional shaft constituted by a first torsion beam 84 by electrostatic attraction generated between the drive gimbal plate 82 and the respective drive electrodes 83. In this manner, the center of mass of the inertia mass member 81 performs simple harmonic motion in an X-axis direction.

On the other hand, when the entire system of the angular velocity sensor 80 is rotated about a Z-axis, Coriolis force F is generated in the direction of a Y-axis, perpendicular to the X-axis direction and the Z-axis direction:

$$F=2vM\Omega$$

where v is a velocity of the center of mass in the X-axis direction, $\Omega$ is an angular velocity of rotation, and M is a mass of the inertia mass member 81.

In response to the generation of the Coriolis force F, in a detection gimbal frame 85 arranged outside the drive gimbal plate 82, torsional simple harmonic motion about the Y-axis is induced about the torsion axis of a second torsion beam 86. By the torsional vibration about the Y-axis, an electrostatic capacitance between a detection electrode 87 arranged on the detection gimbal frame 85 and the detection gimbal frame 85 changes. The change in electrostatic capacitance is detected by a detection electric circuit 89 and electrically converted into a voltage, so that a sensor output voltage, which is in proportion to the angular velocity $\Omega$, can be obtained.

As described above, in the prior art, since electrostatic attraction generated between the parallel plates constituted by the drive electrodes 83 and the drive gimbal plate 82 is used as a means for inducing torsional vibration, drive displacement which can be stably vibrated is regulated for the following reason. That is, since the electrostatic attraction is in inverse proportion to the square of the gap between the drive electrode 83 and the drive gimbal plate 82, when a displacement amplitude is larger than a certain threshold value, the electrostatic attraction exceeds the resilience of a torsion spring, and a pull-in phenomenon in which the plate 82 is stuck to the opposing drive electrodes 83 occurs.

Therefore, in the angular velocity sensor 80 which employs the electrostatic drive system, the maximum value of a drive displacement amplitude which can be controlled by a gap, is disadvantageously equal to or smaller than at least the gap. For the sake of convenience, in consideration of a case in which the frequency of the torsional vibration is fixed, an improvement in sensitivity of the sensor copes with an increase of the velocity of the center of mass in the X-axis direction and also copes with an increase in displacement amplitude. However, when a gap between the parallel-plate electrodes is present, the maximum amplitude is equal to or smaller than the gap (about ⅓ of the gap because of the pull-in phenomenon). Accordingly, in order to improve the sensitivity of the sensor, a means for increasing the gap is inevitably used. With the increase of the gap, the drive voltage and the opposite area must be large.

In this manner, in the angular velocity sensor which employs a conventional electrostatic drive system, sensor design for improving the sensitivity of the sensor is regulated, and an obstruction to the design occurs.

The present invention has been made in consideration of the above technical problems, and has as its object to provide a sensitive angular velocity sensor without increasing a gap between electrodes for inducing torsional vibrations.

SUMMARY OF THE INVENTION

In an aspect of the present invention, there is provided an angular velocity sensor which employs an electrostatic drive system for inducing drive vibration by using inter-electrode electrostatic attraction comprising a pair of inertial mass members which are connected to each other through a connection frame having a predetermined length such that the inertial mass members are point-symmetrical with respect to a central point of the connection frame and which are held along a plane direction of a substrate, a pair of elastic beams which are connected to each other at a predetermined interval in opposite directions along a longitudinal direction from the central point of the frame on both the sides of the connection frame, a pair of drive plates which are connected to the other ends of the elastic beams, which have an electrode constituting an electrostatic attraction generating structure together with a drive electrode arranged on the substrate, and which are supported such that the drive plates can be moved in at least one direction along the plane direction of the substrate to torsionally vibrate the inertial mass members about the central point of the connection frame, an electrode for detecting displacement of the inertial mass members in a direction vertical to the plane direction of the substrate during displacement vibration of the inertial mass members according to an inertial force generated with the torsional vibrations of the inertial mass members in a direction vertical to the plane direction of the substrate, and torsional vibration detector for detecting amplitudes of torsional vibrations of the inertial mass members about the central point of the connection frame.

Said electrode and the drive electrode in the drive plate constituting the electrostatic attraction generating structure may be parallel-plate electrodes. Said electrode and the drive electrode in the drive plate constituting the electrostatic attraction generating structure may be comb-like electrodes.

As the torsional vibration detector, a plate-like electrode opposing at least parts of the inertial mass members may be arranged on the substrate to constitute parallel-plate electrodes together with the inertial mass members. As the torsional vibration detector, a comb-like electrode may be arranged integrally with the inertial mass members, and a comb-like electrode which can opposite to the above comb-like electrode to constitute a bush structure may be arranged on the substrate.

A support member for holding the inertial mass members above the substrate along the plane direction of the substrate may be arranged integrally with the inertial mass members.

DETAILED DESCRIPTION OF THE INVENTION

Embodiments of the present invention will be described below with reference to the accompanying drawings.

First Embodiment

Figure 1:
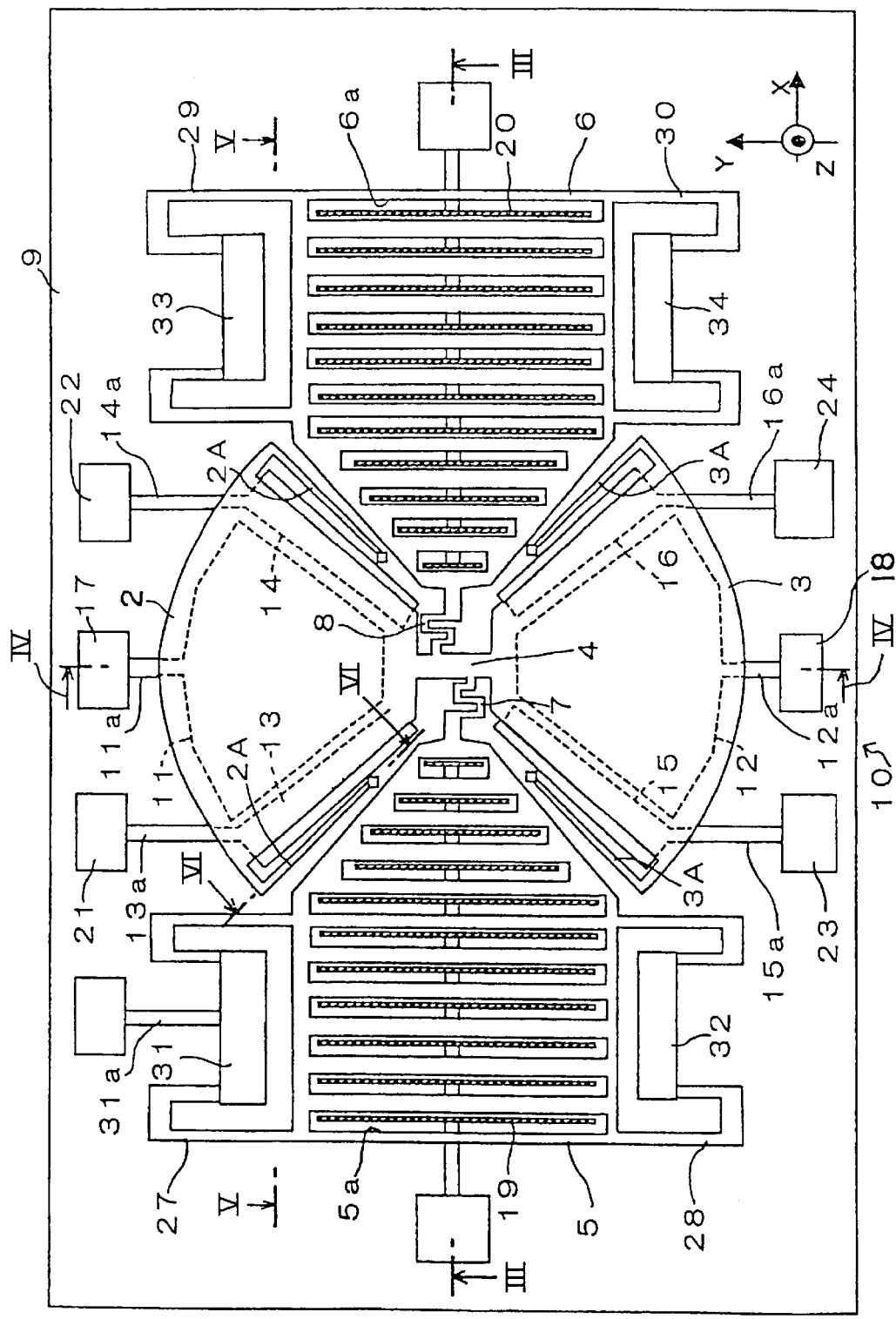
FIG. 1 is a plan view of an angular velocity sensor according to a first embodiment of the present invention.
Figure 2:
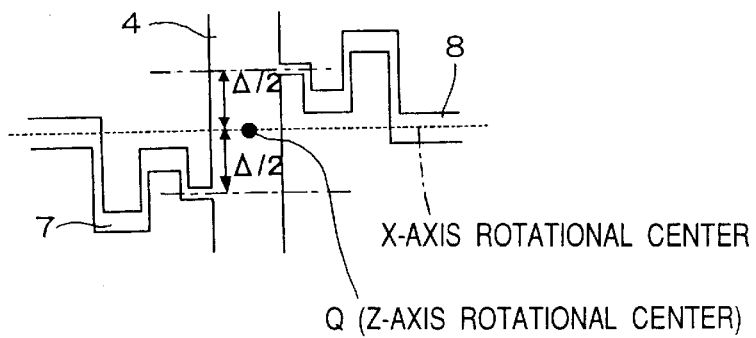
FIG. 2 is an enlarged diagram showing a rotational central portion of an angular velocity sensor according to the first embodiment.

FIGS. 1 and 2 are a plan view of an angular velocity sensor 10 according to first embodiment of the present invention and an enlarged view for explaining connection portions of drive plates 5 and 6 to a connection frame 4 through link beams 7 and 8. FIGS. 3, 4, 5, and 6 are longitudinal sectional views for explaining the angular velocity sensor taken along lines III—III, IV—IV, V—V, and VI—VI in FIG. 1, respectively. It is noted that, in FIG. 1, the horizontal direction is defined as an X-axis direction, the vertical direction is defined as a Y-axis direction, and a direction vertical to the surface of the drawing is defined as a Z-axis direction.

The angular velocity sensor 10 has a configuration in which respective components are arranged on a semiconductor substrate 1 having a thin insulating film 9 is formed thereon, and comprises a pair of inertial mass members 2 and 3 each having a sector shape. The inertial mass members 2 and 3 are connected to each other through the connection frame 4 extending in a Y-axis direction such that the central angle sides of the sector shapes are opposite to each other. As is apparent from FIG. 4, the inertial mass members 2 and 3 are horizontally held above the semiconductor substrate 1.

As holding means of the inertial mass members 2 and 3, auxiliary support beams 2A and 3A are arranged on both the sides of the body. As is typically illustrated in FIG. 6 as the auxiliary support beam 2A of these auxiliary support beams 2A and 3A, the auxiliary support beam 2A extends along both the edge portions of the inertial mass members 2 and 3, and is vertically bent downward on the central angle sides of the sector shapes formed by the inertial mass members 2 and 3. Thus, the distal end of the auxiliary support beam 2A is brought into contact with the semiconductor substrate 1. In this manner, the inertial mass members 2 and 3 are horizontally held above the semiconductor substrate 1.

Figure 4:
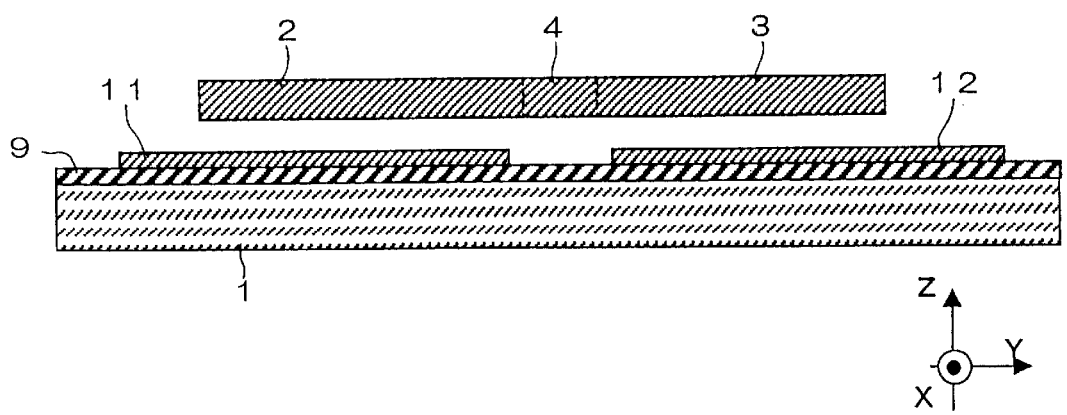
FIG. 4 is a sectional view for explaining the angular velocity sensor along a line IV—IV in FIG. 1.
Figure 5:
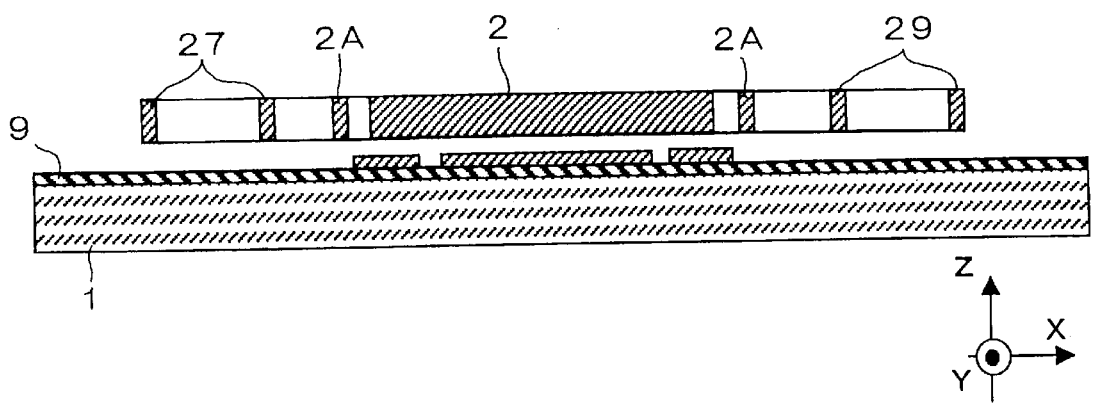
FIG. 5 is a sectional view for explaining the angular velocity sensor along a line V—V in FIG. 1.
Figure 6:
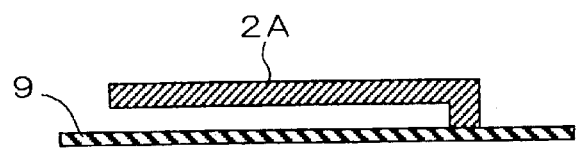
FIG. 6 is a sectional view for explaining the angular velocity sensor along a line Vi–VI in FIG. 1.

As is apparent from FIGS. 1 and 4, detection electrodes 11 and 12 are arranged on portions of the insulating film 9 corresponding to the inertial mass members 2 and 3. The inertial mass members 2 and 3 and the detection electrodes 11 and 12 are electrically independent of each other at small intervals in a Z-axis direction. The detection electrodes 11 and 12 are formed to have almost sector shapes in correspondence with the inertial mass members 2 and 3, and comprise wiring layers 11a and 12a extending from the arcs side of the detection electrodes 11 and 12 to the outside. The distal ends of the wiring layers 11a and 12a are connected to metal wiring pads 17 and 18 formed by depositing aluminum, gold, or the like on the insulating film 9. The metal wiring pads 17 and 18 form regions on which predetermined wires are bonded for electrical connection to external circuits.

In addition, monitor electrodes 13, 14, 15 and 16 are arranged on portions of the insulating film 9 corresponding to the inertial mass members 2 and 3 along the radial portions on both the sides of the detection electrodes 11 and 12. The respective monitor electrodes 13, 14, 15 and 16 comprise wiring layers 13a, 14a, 15a, and 16a extending from one ends of the monitor electrodes 13, 14, 15 and 16 to the outside. The distal ends of the wiring layers 13a, 14a, 15a, and 16a are connected to metal wiring pads 21, 22, 23, and 24 arranged on the insulating film 9.

In the angular velocity sensor 10, as is apparent from FIG. 1, the drive plates 5 and 6 are arranged symmetrically with reference to the inertial mass members 2 and 3 and the connection frame 4. These drive plates 5 and 6, like the inertial mass members 2 and 3, are horizontally held above the semiconductor substrate 1. As holding means therefor, pairs of folded beams 27, 28, and 29, 30 are formed on both the sides (upper and lower sides in FIG. 1) of the respective drive plates 5 and 6. The folded beams 27, 28, 29, and 30 are bent at their ways, and the distal ends of the folded beams 27, 28, 29, and 30 are connected by the anchor portions 31, 32, 33, and 34, respectively. The folded beams 27, 28, 29, and 30 are designed such that the folded beams 27, 28, 29, and 30 are flexible and are easily transformed in the X-axis direction but are not easily transformed in other directions. The drive plates 5 and 6 are connected to the connection frame 4 through the link beams 7 and 8 having elasticities in the X-axis direction, respectively.

FIG. 2 enlargedly shows the connection portion of the drive plates 5 and 6 to the connection frame 4 through the link beams 7 and 8. On both the sides of the connection frame 4, the link beams 7 and 8 are fixed to portions predetermined lengths distant from a center Q of the connection frame 4 in opposite directions along the Y-axis direction. In this embodiment, the link beams 7 and 8 are fixed to portions Δ/2 distant from the center Q of the connection frame 4 along the Y-axis direction. The link beams 7 and 8 are formed into bent shapes having elasticities in the X-axis and Y-axis directions.

The drive plates 5 and 6 are connected one ends of the link beams 7 and 8 joined to the connection frame 4, respectively. As a result, the drive plates 5 and 6 can be moved within ranges allowed on the basis of the elasticities of the link beams 7 and 8 with respect to the connection frame 4. The drive plates 5 and 6 comprise electrostatic attraction generating structures. The drive plates 5 and 6 have, as the structures, a plurality of slits 5a and 6a formed along the Y-axis direction on the plane portions of the drive plates 5 and 6.

Figure 3:
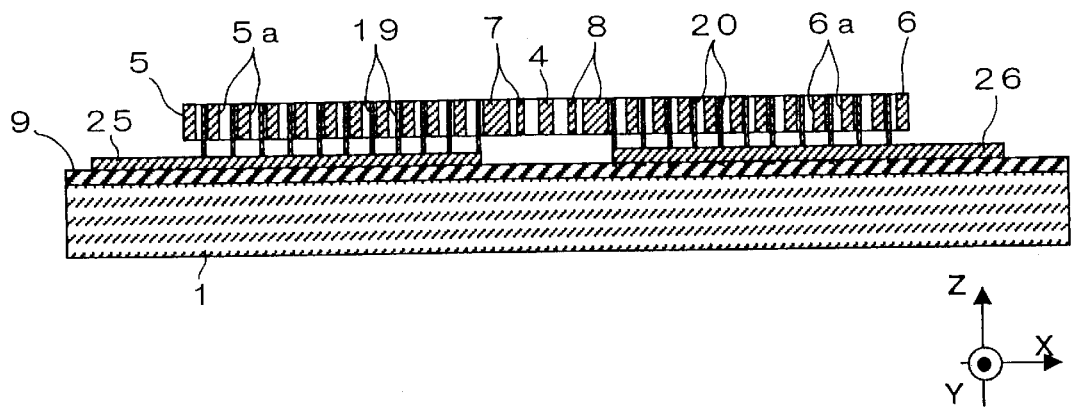
FIG. 3 is a sectional view for explaining the angular velocity sensor along a line III—III in FIG. 1.

On the other hand, a plurality of drive electrodes 19 and 20 planarly formed in correspondence with the slits 5a and 6a of the drive plates 5 and 6 are arranged along the Y-axis direction on the semiconductor substrate 1. The drive electrodes 19 and 20 are joined to drive electrode connection electrodes 25 and 26 formed on the insulating film 9 such that the drive electrodes 19 and 20 rise vertical to the semiconductor substrate 1. As shown in FIG. 3, the drive electrodes 19 and 20 are accommodated in the corresponding slits 5a and 6a, respectively. In this state, the drive electrodes 19 and 20 and the inner walls of the slits 5a and 6a are supported in parallel to each other. In this manner, the slits 5a and 6a formed in the drive plates 5 and 6 and the drive electrodes 19 and 20 accommodated in the slits 5a and 6a constitute a pair of parallel-plate electrodes which are separated by a small gap.

As is apparent from FIG. 3, intervals between the drive electrodes 19 and 20 and the walls of the slits 5a and 6a in the X-axis direction are set such that one interval is smaller than the other interval. In this embodiment, the drive electrodes 19 and 20 are set to be arranged in the slits 5a and 6a such that the drive electrodes 19 and 20 are close to the connection frame 4, i.e., are close to the center. In this manner, since a large electrostatic force is generated by a small interval, the drive plates 5 and 6 can be displaced in the X-axis direction.

The angular velocity sensor 10 may be manufactured by using a surface micro-machining process. In this embodiment, a monocrystalline silicon substrate is used as the material of the semiconductor substrate 1, and a nitride film or an oxide film is used as the material of the insulating film 9. As the materials of the inertial mass members 2 and 3, the connection frame 4, the link beams 7 and 8, the detection electrodes 11 and 12, the monitor electrodes 13, 14, 15 and 16, the drive electrodes 19 and 20, the folded beams 27, 28, 29, and 30 serving as movable structures, and the anchor portions 31, 32, 33, and 34, polysilicon having a low electrical resistance is used. Similarly, as the materials of the drive electrode connection wiring layers 25 and 26 and wiring layers 31a extending from the other electrodes (the detection electrodes 11 and 12 and the monitor electrodes 13, 14, 15 and 16) and various structures (e.g., the anchor portion 31) to the outside, polysilicon having a low electrical resistance is used.

An operation principle related to the angular velocity sensor 10 having the above configuration will be described below. When an AC potential difference is given across the drive plates 5 and 6 and the drive electrodes 19 and 20, the drive plates 5 and 6 are vibrated in the X-axis direction by electrostatic attraction generated by the potential difference. When the drive plates 5 and 6 are electrically grounded, and when AC voltages (Vdc±Vca) of the same phase with a common DC bias voltage are applied to the drive electrodes 19 and 20, the left and right drive plates 5 and 6 are vibrated to opposite phases along the X-axis direction. At this time, the connection frame 4 receives a force in the X-axis direction through the link beams 7 and 8 connected to the drive plates 5 and 6 at each end. Since the forces transmitted from both the left and right link beams 7 and 8 act between two different points on the Y-axis on the connection frame 4, the connection frame 4 and the inertial mass members 2 and 3 connected to the connection frame 4 are subjected to rotationally torsional vibration about the center Q on the connection frame 4. This rotationally torsional vibration occurs at the resonance frequency, the maximum displacement vibration and the maximum velocity vibration are acquired. In this manner, as a drive AC voltage, the resonance frequency is preferably selected.

As described above, when the inertial mass members 2 and 3 are subjected to rotationally torsional vibration to opposite phases on the semiconductor substrate 1, if an angular velocity about the Y-axis is input, the inertial mass members 2 and 3 receive an inertial force, i.e., a Coriolis force in directions (Z-axis direction perpendicular to the semiconductor substrate 1) perpendicular to the velocity vibration vector directions and the angular velocity vector directions of the inertial mass members 2 and 3. As a result, the inertial mass members 2 and 3 receive inertial forces with opposite phases acting to the outside of the semiconductor substrate 1, and rotational vibration about a central axis in the X-axis direction shown in FIG. 2 is induced. Since the displacement of the rotational vibration is proportionate to the angular velocity, the displacement is converted into an electric output by a C-V converter through a capacity change between the inertial mass members 2 and 3 and the detection electrodes 11 and 12 arranged on the lower side of the inertial mass members 2 and 3, so that an angular velocity signal can be acquired. A capacity change generated between the detection electrodes 11 and 12 and the inertial mass members 2 and 3 becomes a differential change in detecting an angular velocity. When a circuit configuration which can detect the differential change is employed, a configuration which is not adversely affected by disturbance vibration (displacement vibration of the inertial mass members 2 and 3 generated by accelerations in the X-axis direction and the Z-axis direction) which changes in the same phase can be realized.

On the other hand, the monitor electrodes 13, 14, 15 and 16 are arranged as vibration detection structures for monitoring the torsional vibrations of the inertial mass members 2 and 3 and for controlling the amplitudes of the torsional vibrations to constant values. In this case, the monitor electrodes 13 and 16 are connected to each other, and the monitor electrodes 14 and 15 are connected to each other, so that a differential change configuration is realized as a capacitor formed between the inertial mass members 2 and 3 by a drive torsional vibration. In this case, similarly, a configuration which is not adversely affected by disturbance vibration can be realized.

The characteristic feature of the configuration according to first embodiment is as follows. That is, with the link beams 7 and 8 which are bent several times to obtain elasticities, even though the displacements of the drive plates 5 and 6 are small (for example, about ⅓ or less of the interval between the electrodes) to control electrostatic attraction generated between the parallel-plate electrodes, the displacements can be increased at connection points to the connection frame 4 by the elastic displacement effects of the link beams 7 and 8 in resonance. In addition, since the link beams 7 and 8 are distant from each other by a small distance (Δ) in the Y-axis direction, even though the displacements of the connection points with respect to the link beams 7 and 8 in the X-axis direction are small, the torsional vibration angles of the connection frame 4 and the inertial mass members 2 and 3 increase.

As is apparent from the above description, in the angular velocity sensor 10, the large torsional vibrations of the inertial mass members 2 and 3 can be induced at a low voltage without increasing the gap between the electrodes, and the amplitudes of the torsional vibrations can be increased. As a result, the sensitivity of the sensor can be improved.

In first embodiment, the case in which the link beams 7 and 8 have spring structures obtained by bending the link beams 7 and 8 several times to increase the displacements of the drive plates 5 and 6 in resonance is described. However, as the link beams 7 and 8, link beams having structures for transmitting at least the displacements or forces of the drive plates 5 and 6 to the connection frame 4 may be employed.

Second Embodiment

Figure 8:
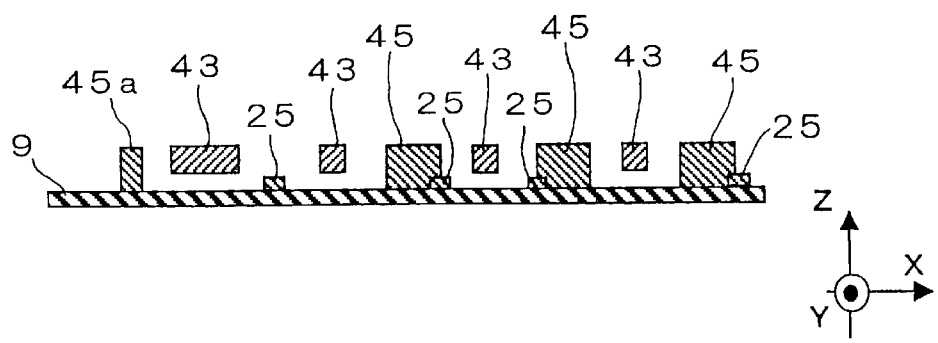
FIG. 8 is a sectional view for explaining the angular velocity sensor along a line VIII—VIII in FIG. 7.
Figure 7:
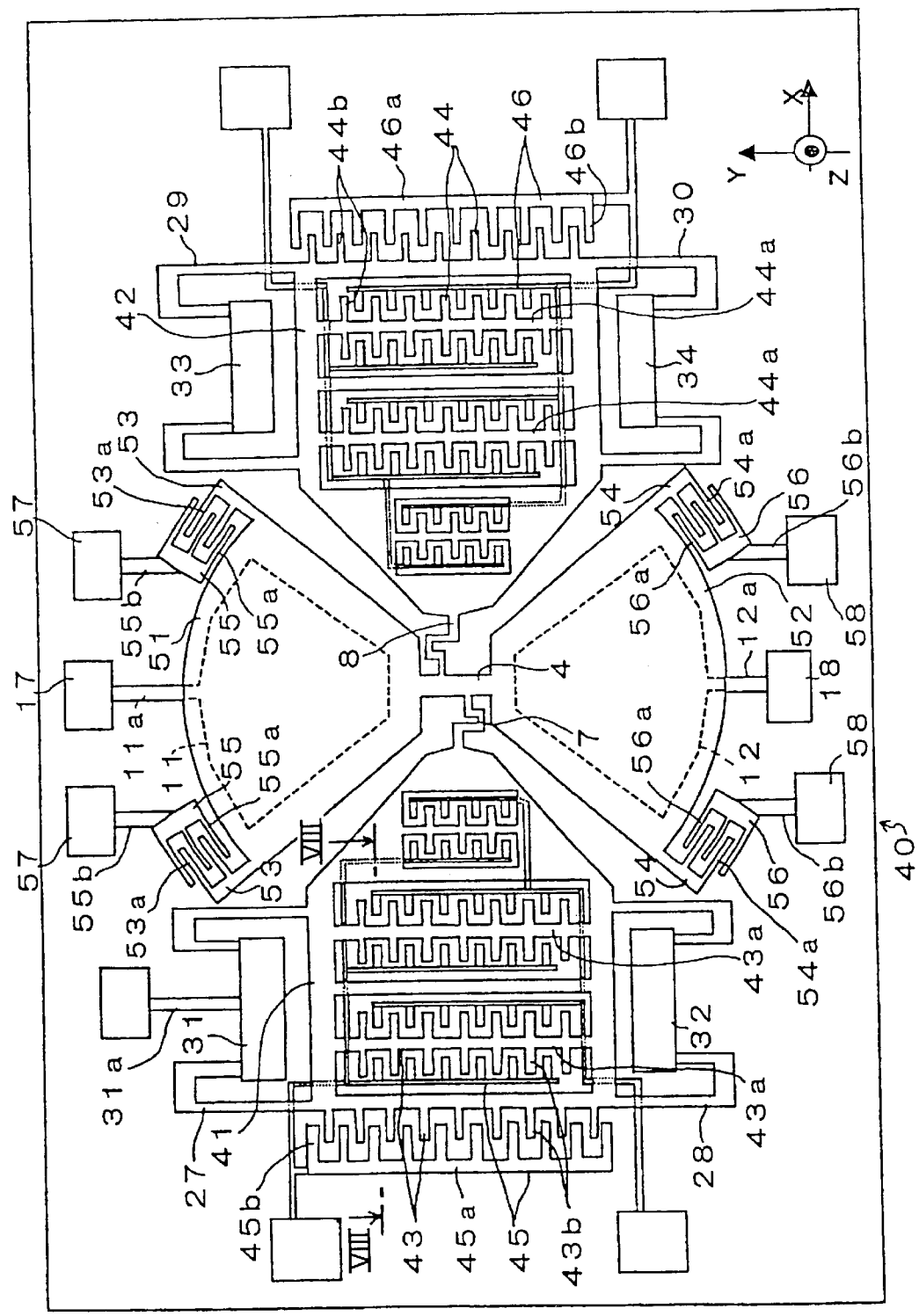
FIG. 7 is a plan view of an angular velocity sensor according to a second embodiment of the present invention.
Figure 9:
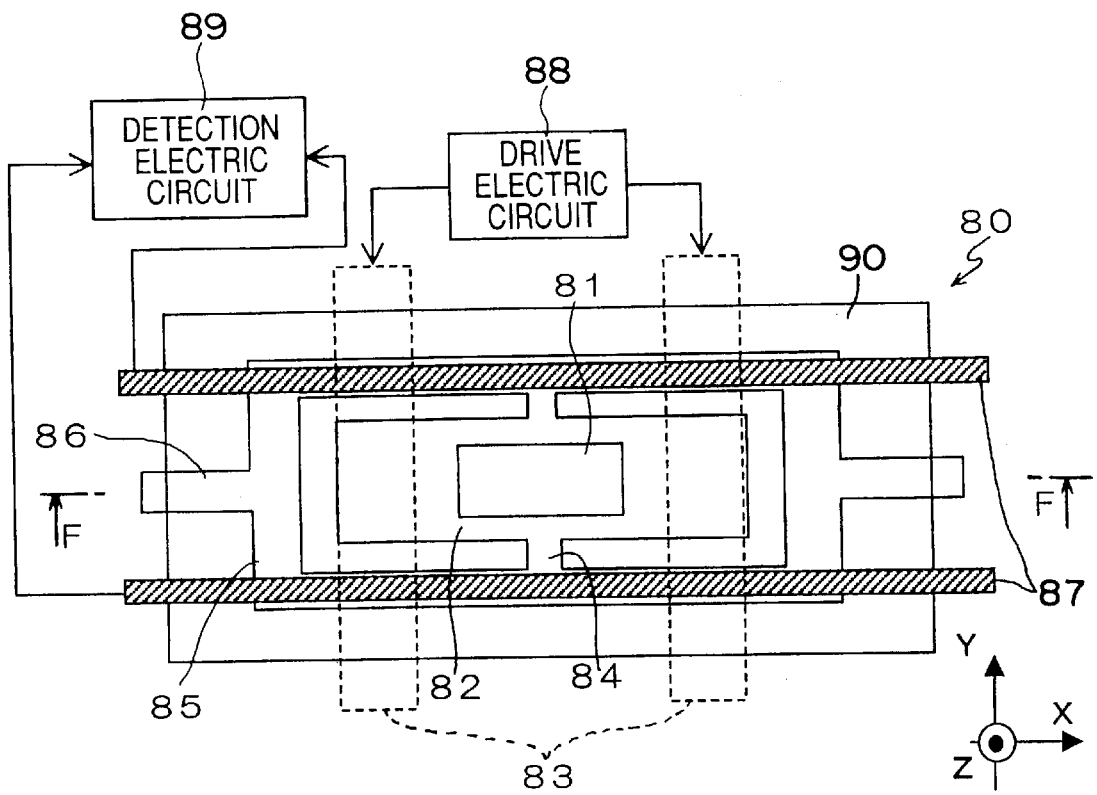
FIG. 9 is a front view of a conventional angular velocity sensor.
Figure 10:
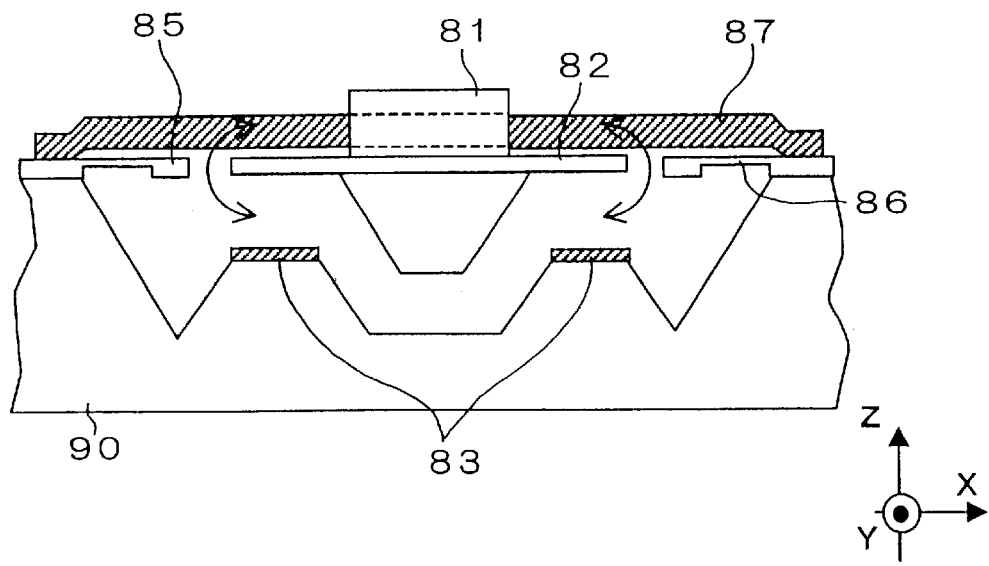
FIG. 10 is a transversal sectional view for explaining the angular velocity sensor along a line X—X in FIG. 9.

Second embodiment of the present invention will be described below. The same reference numerals as in the case of first embodiment denote the same parts in second embodiment, and a description thereof will be omitted. FIGS. 7 and 8 are a plan view of an angular velocity sensor 40 according to second embodiment and a longitudinal sectional view for explaining the angular velocity sensor 40 along a line E—E in FIG. 7, respectively. Second embodiment is different from first embodiment in electrostatic attraction generating structures in a drive plate and a drive electrode and a vibration detection structure for monitoring the torsional vibrations of inertial mass members 2 and 3 and for controlling the amplitudes of the torsional vibrations to constant values.

As is apparent from FIG. 7, in the angular velocity sensor 40 according to second embodiment, as electrostatic attraction generating structures, electrodes 43 and 44 formed on the drive plate 41 and 42 side and drive electrodes 45 and 46 arranged in correspondence with the electrodes 43 and 44 are formed to have comb-like shapes. More specifically, the electrodes 43 and 44 formed on the drive plate 41 and 42 side are constituted by a plurality of support frames 43a and 44a arranged along a Y-axis direction and comb teeth 43b and 44b projecting from both the sides or one side of the support frames 43a and 44a in a direction (X-axis direction) perpendicular to the support frames 43a and 44a. On the other hand the drive electrodes 45 and 46 are constituted by support frames 45a and 46a arranged along the Y-axis direction and comb teeth 45b and 46b projecting from one side of the support frames 45a and 46a in a direction perpendicular to the support frames 45a and 46a. In this case, as is apparent from FIG. 7, the drive plates 41 and 42 and the drive electrodes 45 and 46 are arranged such that the comb teeth 43b and 44b are opposite to the comb teeth 45b and 46b.

With this configuration, electrostatic attraction generated between the comb teeth 43b and 44b along the X-axis direction in the electrodes 43 and 44 on the drive plate 41 and 42 side and the comb teeth 45b and 46b in the drive electrodes 45 and 46 is not dependent on a drive displacement in the X-axis direction and is proportionate to an inter-electrode voltage. For this reason, displacement is prevented from being uncontrollable by electrostatic attraction nonlinearity caused by displacement which is posed as a problem in the prior art.

In second embodiment, a vibration detection structure for monitoring torsional vibrations of torsional mass members 51 and 52 and for controlling the amplitudes of the torsional vibrations to constant values have such comb-like configurations that the vibration detection structures can be opposite to each other in a bush structure. More specifically, comb-like electrodes 53 and 54 having a plurality of comb teeth 53a and 54a are formed integrally with the arc sides of the torsional mass members 51 and 52, and comb-like electrodes 55 and 56 having comb teeth 55a and 56a which can be opposite to the comb teeth 53a and 54a in the comb-like electrodes 53 and 54 are arranged. The comb-like electrodes 55 and 56 have wiring layers 55b and 56b extending to the outside. The distal ends of the wiring layers 55b and 56b are connected to metal wiring pads 57 and 58 formed by depositing aluminum, gold, or the like on an insulating film 9, respectively.

In this manner, when a system for detecting an electrostatic capacity change by using the electrodes 53 and 54 and the electrodes 55 and 56 which are formed to have comb-like shapes is used, the same effect as that in Embodiment described above can be obtained.

Although not illustrated in FIG. 7, as means for holding the torsional mass members 51 and 52, for example, auxiliary beams 2A and 3A as described in first embodiment may be integrally formed on both the sides of the torsional mass members 51 and 52. In this manner, the torsional mass members 51 and 52 can be horizontally held above the semiconductor substrate 1.

The present invention is not limited to the illustrated embodiments, and various modifications and various changes in design can be effected without departing from the spirit and scope of the present invention, as a matter of course. Under the conditions in which an inter-electrode voltage difference, an inter-electrode gap, and a length of opposite electrodes in the drive plate are same for the drive plate and drive electrode, a drive electrostatic force generated by the parallel-plate electrodes according to first embodiment can be made stronger than a drive electrostatic force generated by the comb-like electrodes according to second embodiment. On the other hand, with respect to the stability of a quantity of drivable displacement, the comb-like electrodes according to second embodiment are excellent.

What is claimed is:

1. An angular velocity sensor which employs an electrostatic drive system inducing drive vibration using inter-electrode electrostatic attraction, the sensor comprising:

a pair of inertial mass members connected to each other through a connection frame having a length such that the inertial mass members are symmetrical with respect to a central point of the connection frame, and held along a plane direction of a substrate;

a pair of elastic beams connected to each other at an interval in opposite directions along a longitudinal direction, from the central point of the connection frame on opposite sides of the connection frame;

a pair of drive plates connected to ends of the elastic beams, and having an electrode constituting, with a drive electrode on the substrate, an electrostatic attraction generating structure, and supported such that the drive plates can be moved in at least one direction along the plane direction of the substrate and torsionally vibrate the inertial mass members about the central point of the connection frame;

an electrode for detecting displacement of the inertial mass members in a direction perpendicular to the plane direction of the substrate, during displacement vibration of the inertial mass members, according to an inertial force generated by the torsional vibrations of the inertial mass members in a direction perpendicular to the plane direction of the substrate; and a torsional vibration detector for detecting amplitudes of the torsional vibrations of the inertial mass members about the central point of the connection frame.

2. The angular velocity sensor according to claim 1, wherein the electrode and the drive electrode in the drive plate are parallel-plate electrodes.

3. The angular velocity sensor according to claim 1, wherein the electrode and the drive electrode in the drive plate are comb-like electrodes.

4. The angular velocity sensor according to claim 1, wherein the torsional vibration detector includes a plate electrode opposing at least parts of the inertial mass members, on the substrate.

5. The angular velocity sensor according to claim 1, wherein the torsional vibration detector includes a first comb-like electrode integral with the inertial mass members, and a second comb-like electrode opposite the first above comb-like electrode as a bush structure arranged on the substrate.

6. The angular velocity sensor according to claim 1, including a support member holding the inertial mass members spaced from the substrate along the plane direction of the substrate integral with the inertial mass members.

* * * * *